United States Patent
Payne et al.

(10) Patent No.: US 9,256,599 B1
(45) Date of Patent: Feb. 9, 2016

(54) PROGRAMMATICALLY RECEIVING AND STORING TRANSACTION INFORMATION IN SUPPORT OF A DATABASE RECOVERY ENGINE

(75) Inventors: Michael Payne, Archer, FL (US); Howard Alan Ojalvo, Shoreview, MN (US)

(73) Assignee: Symantec Corporation, Mountain View, CA (US)

( * ) Notice: Subject to any disclaimer, the term of this patent is extended or adjusted under 35 U.S.C. 154(b) by 1489 days.

(21) Appl. No.: 12/342,276

(22) Filed: Dec. 23, 2008

(51) Int. Cl.
*G06F 17/30* (2006.01)
*G06F 11/14* (2006.01)

(52) U.S. Cl.
CPC ...... *G06F 17/30008* (2013.01); *G06F 11/1469* (2013.01); *G06F 11/1471* (2013.01); *G06F 17/30575* (2013.01)

(58) Field of Classification Search
CPC ............ G06F 11/1469; G06F 11/2056; G06F 17/30008; G06F 17/30575; G06F 11/471
USPC .................................. 707/653, 654
See application file for complete search history.

(56) References Cited

U.S. PATENT DOCUMENTS

| | | | |
|---|---|---|---|
| 6,115,721 A | 9/2000 | Nagy | |
| 7,277,900 B1 * | 10/2007 | Ganesh et al. | 707/682 |
| 7,281,023 B2 * | 10/2007 | Lou | 707/684 |
| 7,657,576 B1 * | 2/2010 | Norcott | 707/999.202 |
| 7,707,184 B1 | 4/2010 | Zhang | |
| 7,725,428 B1 | 5/2010 | Hawkins | |
| 7,756,818 B1 | 7/2010 | Parker | |
| 7,822,717 B2 | 10/2010 | Kapoor | |
| 2002/0007363 A1 * | 1/2002 | Vaitzblit | 707/202 |
| 2006/0047626 A1 * | 3/2006 | Raheem | 707/2 |
| 2007/0185922 A1 * | 8/2007 | Kapoor et al. | 707/202 |
| 2007/0294568 A1 * | 12/2007 | Kanda et al. | 714/6 |
| 2008/0222510 A1 * | 9/2008 | Nguyen et al. | 715/212 |
| 2008/0228833 A1 * | 9/2008 | Kano | 707/202 |
| 2008/0281865 A1 * | 11/2008 | Price et al. | 707/103 Y |
| 2008/0281876 A1 * | 11/2008 | Mimatsu | 707/202 |
| 2009/0089614 A1 * | 4/2009 | Eguchi et al. | 714/15 |
| 2010/0030824 A1 * | 2/2010 | Shang et al. | 707/204 |

OTHER PUBLICATIONS

"SQL Sewer Audit in SQL Server 2008—Part 1", Yan Pan, Jun. 6, 2008. (http://www.databasejournal.com/features/mssql/article.php/3751161/SQL-Server-Audit-in-SQL-Server-2008--Part-1.htm).

* cited by examiner

*Primary Examiner* — Shew-Fen Lin
(74) *Attorney, Agent, or Firm* — Meyertons, Hood, Kivlin, Kowert & Goetzel, P.C.

(57) ABSTRACT

A system and method for restoring a database are described. The method may comprise requesting to begin receiving notifications of transactions that occur in the database. In response to the request, notifications of a plurality of transactions that occur in the database may be received, and information specifying the plurality of transactions may be stored. The method may further comprise receiving user input requesting to restore the database to a previous state. In response, the stored information may be retrieved, and a graphical user interface indicating the plurality of transactions specified by the stored information may be displayed. The method may further comprise receiving user input to the graphical user interface selecting a particular transaction of the plurality of transactions. In response, the database may be restored to a particular point in time relative to a time at which the particular transaction occurred.

18 Claims, 3 Drawing Sheets

PROGRAMMATICALLY RECEIVING AND STORING TRANSACTION INFORMATION IN SUPPORT OF A DATABASE RECOVERY ENGINE

BACKGROUND OF THE INVENTION

1. Field of the Invention

This invention relates to the field of computer databases. More particularly, the invention relates to a system and method for restoring a database to a state as it existed at a previous point in time.

2. Description of the Related Art

Relational databases are often used to store data used by computer systems. In a relational database, the data is stored in the form of tables, where the tables include rows and columns. The relationship among the data is also stored in the form of tables. The database can be changed by performing transactions which change the data and/or change the tables or other data structures or objects used to manage or store the data.

Examples of transactions that may be performed in a relational database include: a transaction that inserts one or more new rows into one or more tables of the database; a transaction that changes data represented in one or more columns of one or more rows in the database; a transaction that deletes one or more rows from one or more tables of the database, or deletes one or more tables altogether; a transaction that adds one or more new tables to the database or otherwise changes the schema of the database.

Users (e.g., administrators of the database) may sometimes need to "undo" some of the transactions that have occurred in the database, e.g., in order to restore or roll back the database to a state as it existed at a previous point in time. For example, a transaction which previously occurred in the database may have erroneously deleted data or one or more tables from the database, or may have otherwise changed the database in an undesired way.

SUMMARY

Various embodiments of a system and method for restoring a database are described herein. According to some embodiments, the method may comprise requesting to begin receiving notifications of transactions that occur in the database. In response to the request, notifications of a plurality of transactions that occur in the database may be received, and information specifying the plurality of transactions may be stored.

The method may further comprise receiving user input requesting to restore the database to a previous state. In response, the stored information may be retrieved, and a graphical user interface indicating the plurality of transactions specified by the stored information may be displayed.

The method may further comprise receiving user input to the graphical user interface selecting a particular transaction of the plurality of transactions. In response, the database may be restored to a particular point in time relative to a time at which the particular transaction occurred.

For example, in some embodiments the particular transaction may be a first transaction of the plurality of transactions, where the first transaction occurs after a second transaction of the plurality of transactions, and where no other transactions of the plurality of transactions occur between the second transaction and the first transaction. Restoring the database may comprise restoring the database to a point in time between the time at which the second transaction occurred and the time at which the first transaction occurred.

As another example, in some embodiments the particular transaction may be a first transaction of the plurality of transactions, where the first transaction occurs before a second transaction of the plurality of transactions, and where no other transactions of the plurality of transactions occur between the first transaction and the second transaction. Restoring the database may comprise restoring the database to a point in time between the time at which the first transaction occurred and the time at which the second transaction occurred.

BRIEF DESCRIPTION OF THE DRAWINGS

A better understanding of the invention can be obtained when the following detailed description is considered in conjunction with the following drawings, in which.

Figure 1:
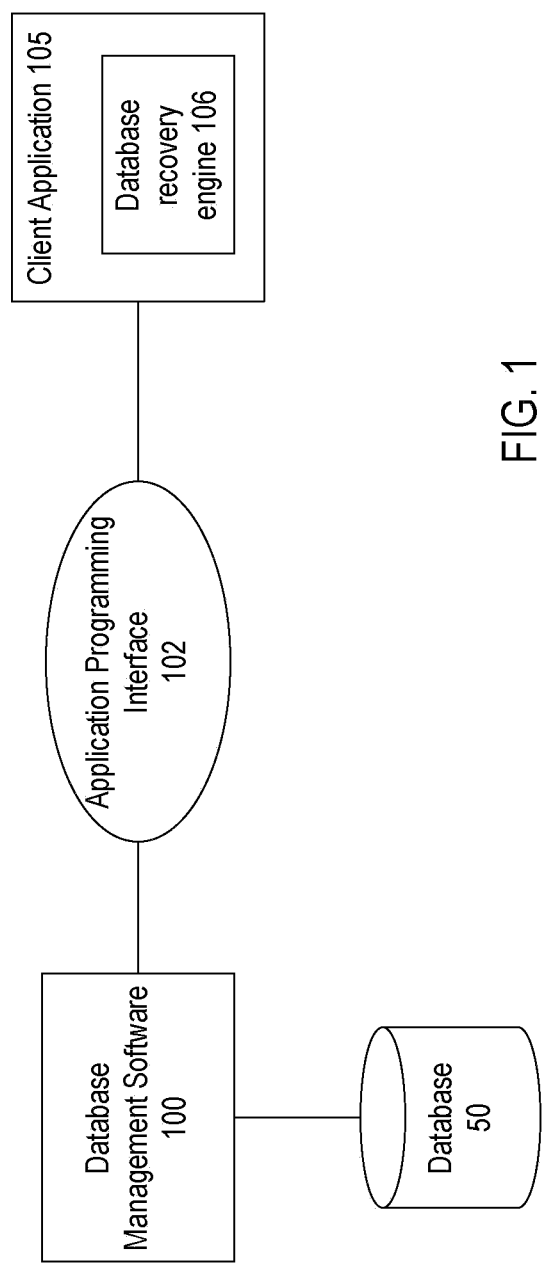
FIG. 1 illustrates an example of a system for restoring a database to a state as it existed at a previous point in time.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for restoring a database to a state as it existed at a previous point in time are disclosed herein. The method may operate to receive notifications of transactions that occur in the database, and store transaction information specifying the plurality of transactions in response to the notifications. The system may include a client application which implements a database recovery engine that communicates with database management software to implement restore functionality which enables a user to request to restore or roll back the database. In response to the user requesting to restore the database, the client application may retrieve the stored transaction information and display a graphical user interface indicating the plurality of transactions specified by the transaction information. The user may then select a particular transaction of the plurality of transactions, where the particular transaction indicates the desired state to which the user desires to restore the database. In response to the user selecting the particular transaction, the database recovery engine may communicate with the database management software to restore the database to a particular point in time relative to the time at which the particular transaction occurred so as to restore the database to the desired state. For example, in some embodiments the database recovery engine may restore the database to a point in time just prior to the time at which the particular transaction selected by the user occurred. In other embodiments, the database recovery engine may restore the database to a point in time just after the time at which the particular transaction selected by the user occurred.

FIG. 1 illustrates an example of the system according to one embodiment. The system includes a database 50 which is managed by database management software 100. For example, the database management software 100 may receive requests to perform various transactions on the database 50 and perform the transactions in response to the requests. In some embodiments the database 50 may be a relational database, and the database management software 100 may be relational database management software. For example, in some embodiments the database 50 may be a relational database managed by SQL Server™ software from Microsoft Corp.

The system also includes a client application 105, e.g., a software application that uses the database 50. A user (e.g., an administrator of the system) may sometimes desire to "undo" some of the transactions that have occurred in the database 50, e.g., in order to restore or roll back the database 50 to a state as it existed at a previous point in time. The client application 105 may be operable to implement various embodiments of the method described herein in order to restore the database 50 to a previous state desired by the user.

The client application 105 is referred to herein as a "client" in the sense of it being a client of the database management software 100. In various embodiments the client application 105 may be any type of software application or program and may use the database 50 for any purpose. The client application 105 may have any desired software architecture. For example, the client application 105 may include various software modules. In some embodiments the functionality described herein pertaining to restoring the database 50 to a previous state may be implemented by one or more software modules referred to herein as a database recovery engine 106.

As illustrated in FIG. 1, the client application 105 (or database recovery engine 106) may communicate with the database management software 100 through an application programming interface (API) 102. The API 102 is a software interface provided by the database management software 100. For example, the API 102 may include various functions or methods which the client application 105 programmatically calls. Particular functions performed by the API 102 according to some embodiments are described below.

Figure 2:
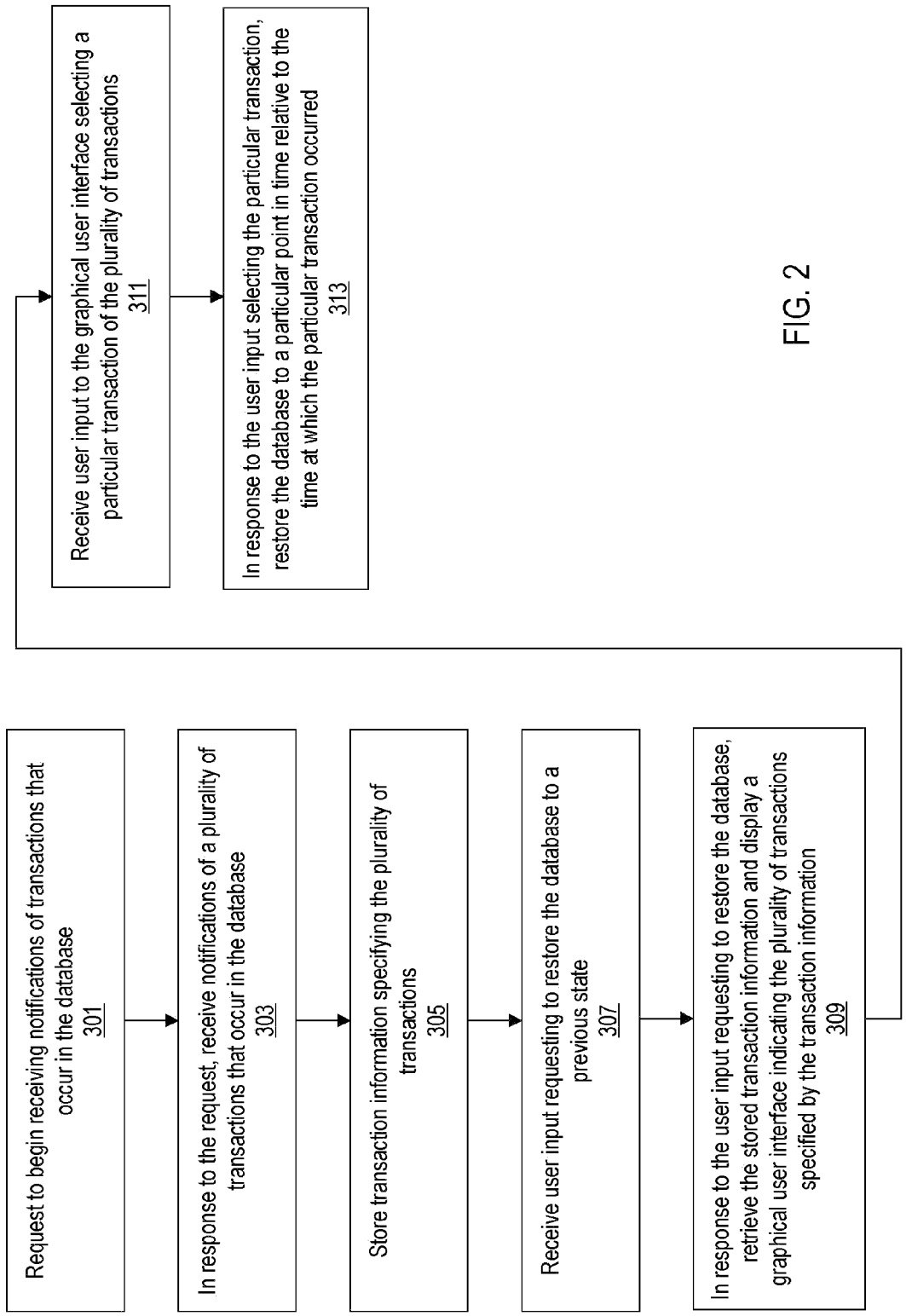
FIG. 2 is a flowchart diagram illustrating one embodiment of a method for restoring the database.

FIG. 2 is a flowchart diagram illustrating one embodiment of the method for restoring the database 50. In some embodiments the method may be implemented by the client application 105 (or database recovery engine 106).

As indicated in 301, the client application 105 may request to begin receiving notifications of transactions that occur in the database. In some embodiments the client application 105 may request to begin receiving the notifications by calling the API 102 of the database management software 100. For example, the API 102 may include one or more functions or methods which the client application 105 programmatically calls in order to request to begin receiving notifications of transactions in the database. As one example, in some embodiments the database 50 may be a Microsoft SQL Server™ database. Some versions of Microsoft SQL Server™ database management software, such as Microsoft SQL Server™ 2008, include auditing capabilities which enable applications to request to receive notifications of database transactions.

As used herein the term "transaction" refers to an operation that changes the database 50. For example, transactions may change the database by changing data in the database or changing data structures or objects used to manage or store the data in the database. There may be various types of transactions. As one example, a transaction may be an operation that inserts or adds new data into the database 50. For example, a transaction may insert one or more new rows into one or more tables of the database 50. As another example, a transaction may be an operation that changes data already stored in the database 50. For example, a transaction may change data represented in one or more columns of one or more rows in the database 50. As another example, a transaction may be an operation that deletes data from the database 50. For example, a transaction may delete one or more rows from one or more tables of the database 50, or may delete one or more tables altogether. As another example, a transaction may be an operation that adds a new object or data structure to the database 50. For example, a transaction may add one or more new tables to the database 50 or otherwise change the schema of the database 50. As another example, a transaction may be an operation that changes or deletes an existing object or data structure from the database 50.

In some embodiments the client application 105 may request to receive notifications only for certain types of transactions that occur in the database 50. For example, in some embodiments, in requesting to begin receiving notifications, the client application 105 may specify one or more transaction types and request to begin receiving notifications of transactions of the specified transaction type(s).

Also, in some embodiments the client application 105 may request to receive notifications only for transactions that change or affect certain objects or data structures in the database 50. For example, in some embodiments, in requesting to begin receiving notifications, the client application 105 may specify one or more objects or data structures in the database 50 and request to begin receiving notifications of transactions that change or affect the one or more specified objects. For example, in some embodiments the client application 105 may specify one or more tables of the database 50 and request to begin receiving notifications only for transactions that change or affect the one or more specified tables.

Referring again to FIG. 2, the client application 105 may receive notifications of a plurality of transactions that occur in the database in response to requesting to receive the notifications, as indicated in 303. For example, after the client application 105 has requested to begin receiving the notifications, the database management software 100 may begin sending notifications representing each new transaction that occurs in the database 50. The notifications of the transactions may be received programmatically by the client application 105. For example, in some embodiments when the client application 105 requests to begin receiving the notifications, the client application 105 may specify one or more callback functions or routines. The database management software 100 may then invoke the specified callback function(s) to notify the client application 105 of new transactions that occur in the database 50. As another example, in some embodiments the database management software 100 may provide the notifications to the client application 105 by sending programmatic events to the client application 105. For example, for each new transaction that occurs in the database 50, that database management software 100 may send a respective programmatic event indicating the transaction to the client application 105.

In some embodiments the database management software 100 may provide the notifications to the client application 105 in real time as the transactions occur in the database 50. For example, as a part of performing each transaction in the database 50, the database management software 100 may notify the client application 105 of the transaction. Thus, in some embodiments the client application 105 may receive the notifications almost immediately as the respective transactions occur.

As indicated in 305, the client application 105 may store transaction information specifying the plurality of transactions in response to receiving the notifications. The transaction information may subsequently be used to restore the database 50 to an earlier state, as described below. In some embodiments, the client application 105 may store the transaction information in one or more files, e.g., where the files are stored on one or more disk drives or other non-volatile storage. In other embodiments, the client application 105 may store the transaction information in one or more data structures stored in dynamic memory, e.g., RAM.

The notifications of the transactions may include information specifying the time that each transaction occurred. Thus, storing the transaction information may include storing the time that each transaction occurred. For example, in various embodiments, the time information for each transaction may specify a particular point in time at the millisecond level, microsecond level, or other granularity of time unit.

The notifications of the transactions may also include other information regarding the transactions which may be stored by the client application 105 in the transaction information. For example, in some embodiments the notifications of the transactions may include information specifying the type of each transaction, such as for example, whether each transaction operates to insert, delete, or change data in the database 50. The transaction information stored by the client application 105 may specify the type of each transaction.

In some embodiments the notifications of the transactions may include information specifying objects or data structures changed by the transactions. For example, if a particular transaction adds, deletes, or changes a particular table then the notification for that transaction may specify the particular table. The transaction information stored by the client application 105 may specify the particular table affected by that transaction.

In some embodiments the notifications of the transactions may include information specifying data affected or used by the transactions. For example, if a particular transaction adds, deletes, or changes particular data then the notification for that transaction may specify the particular data. The transaction information stored by the client application 105 may specify the particular data affected or used by that transaction.

In some embodiments one or more of the transactions may have been performed in response to particular SQL (Structured Query Language) code. In some embodiments the notifications of these transactions may include information specifying the SQL code which caused the transactions. The transaction information stored by the client application 105 may specify the SQL code which caused the transactions.

In some embodiments one or more of the transactions may have been performed in response to executing particular stored procedures or database scripts. In some embodiments the notifications of these transactions may include information specifying the stored procedures or database scripts which caused the transactions. The transaction information stored by the client application 105 may specify the stored procedures or database scripts which caused the transactions.

Subsequently to storing the transaction information, the client application 105 may receive user input requesting to restore the database 50 to a previous state, e.g., user input indicating a desire to roll back the database 50 to a previous state, as indicated in 307. For example, the client application 105 may implement a graphical user interface which includes a menu item or other facility which enables the user to launch a window for restoring the database 50 to a previous state.

In response to the user input requesting to restore the database, the client application 105 may retrieve the stored transaction information and display a graphical user interface indicating the plurality of transactions specified by the transaction information. In various embodiments the plurality of transactions may be indicated or displayed in the graphical user interface in any of various ways. For example, in some embodiments the plurality of transactions may be indicated by listing the transactions in the order of the respective times at which the transactions occurred. Various kinds of information regarding each transaction may also be displayed, such as the time when each transaction occurred, the type of each transaction, the database objects or data affected by each transaction, the SQL code or stored procedures that caused each transaction, etc.

The client application 105 may then receive user input to the graphical user interface selecting a particular transaction of the plurality of transactions, as indicated in 311. In response to the user input selecting the particular transaction, the client application 105 may restore the database 50 to a particular point in time relative to the time at which the particular transaction occurred. In some embodiments the client application 105 may restore the database 50 to the particular point in time by calling the API 102 of the database management software 100 and specifying the particular point in time. In response, the database management software 100 may roll back the database 50 to its state as it existed at the specified point in time. This effectively negates the effects of transactions which occurred after the specified point in time.

For example, in some embodiments the particular transaction selected by the user may represent the latest transaction which the user wants to have occurred in the database 50. Thus, the client application 105 may restore the database to a point in time just after the particular transaction occurred, e.g., may restore the database to a point in time after the time at which the particular transaction occurred and before any transactions later in time than the particular transaction occurred. For example, suppose that the particular transaction selected by the user is a transaction T1 which occurred before another transaction T2, where no other transactions occurred between the transactions T1 and T2. The client application 105 may restore the database to a point in time between the time at which the transaction T1 occurred and the time at which the transaction T2 occurred.

In other embodiments, the particular transaction selected by the user may represent the earliest transaction which the user wants to have not occurred in the database 50. Thus, the client application 105 may restore the database to a point in time just before the particular transaction occurred, e.g., may restore the database to a point in time before the time at which the particular transaction occurred and after any transactions earlier in time than the particular transaction occurred. For example, suppose that the particular transaction selected by the user is a transaction T1 which occurred after another transaction T2, where no other transactions occurred between the transactions T2 and T1. The client application 105 may restore the database to a point in time between the time at which the transaction T2 occurred and the time at which the transaction T1 occurred.

Various embodiments of the method described above may enable a user to restore the database 50 to a previous state without requiring the user to know a point in time which corresponds to the previous state. By displaying information indicating transactions that have occurred in the database 50, the user can determine an appropriate state to which to restore the database based on the transactions. For example, suppose that the user discovers that a particular table in the database has been erroneously deleted. The user may not know when the table was deleted. However, displaying the database transactions which have occurred may enable the user to examine the transactions and allow the user to find the transaction that caused the table to be deleted. The user may then select that transaction and request the client application 105 to restore the database to a point in time just prior to that transaction.

Figure 3:
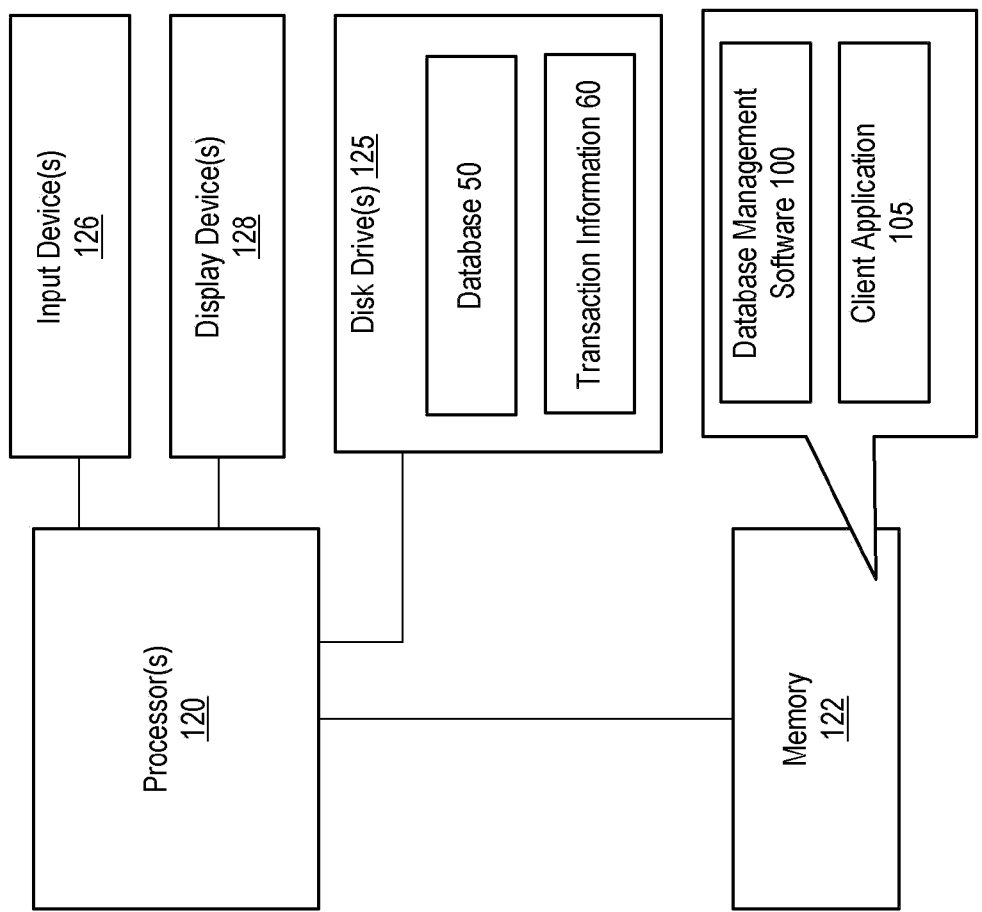
FIG. 3 illustrates an example of a computer system in which the method may be used according to some embodiments.

FIG. 3 illustrates an example of a computer system 85 in which the method may be used according to some embodiments. It is noted that FIG. 3 is provided as an example, and in other embodiments the method may be used in various other types of computer systems. The elements illustrated in FIG. 3 may be included in or coupled to one or more physical computers or computing devices, such as one or more server computers, workstations, desktop computers, mobile computing devices, etc.

In this example, the system 85 includes one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the database management software 100 and the client application 105. (It is noted that in some embodiments the memory 122 may include memory of multiple physical computers. Thus, in some embodiments the database management software 100 and the client application 105 may be stored in memory of different computers, e.g., where the computers may communicate through a network.) The processor(s) 120 may execute the database management software 100 and the client application 105. The memory 122 may also store other software which operates in conjunction with or which is used by the database management software 100 and/or the client application 105, such as operating system software, file system software, network communication software, etc.

In various embodiments the database management software 100 and the client application 105 may be implemented in any of various ways and may have any desired software architecture. In some embodiments the database management software 100 and/or the client application 105 may be distributed across multiple physical computers.

Referring again to FIG. 3, it is noted that the processor(s) 120 is representative of any type of processor. For example, in some embodiments, the processor(s) 120 may be compatible with the x86 architecture, while in other embodiments the processor(s) 120 may be compatible with the SPARC™ family of processors. Also, in some embodiments the system 85 may include multiple processors 120.

The system 85 may include one or more hard disk drives 125 or other storage devices for storing data in a non-volatile manner. In some embodiments the database 50 and/or the transaction information 60 may be stored on one or more of the hard disk drives 125. In other embodiments some or all of the database 50 and/or the transaction information 60 may be stored in the memory 122.

The system 85 may also include one or more input devices 126 for receiving user input, e.g., from an administrator of the system 85. The input device(s) 126 may include any of various types of input devices, such as keyboards, keypads, microphones, or pointing devices (e.g., a mouse or trackball). The system 85 may also include one or more output devices 128 for displaying output to the administrator. The output device(s) 128 may include any of various types of output devices or display devices, such as LCD screens or monitors, CRT monitors, etc. In some embodiments various components of the system 85 may be coupled to each other through one or more networks.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-accessible storage medium storing program instructions executable to:
submit a request to begin receiving notifications of transactions that change data in a database, wherein the request is submitted from a client application to database management software;
in response to the request, receive notifications of a plurality of transactions that change data in the database, wherein the notifications are provided to the client application by sending a plurality of programmatic events from the database management software to the client application, wherein the plurality of transactions occur after the request is submitted, and wherein at least one of the notifications is received by the client application before all of the plurality of transactions have occurred in the database;
store information specifying the plurality of transactions, wherein the information specifying the plurality of transactions is stored by the client application in response to the notifications;
in response to user input requesting to restore the database to a previous state, retrieve the stored information using the client application and display a graphical user interface listing each individual transaction of the plurality of transactions specified by the stored information, wherein at least some of the notifications are received by the client application prior to the user input requesting to restore the database; and
in response to user input selecting a particular transaction of the plurality of transactions listed in the graphical user interface, restore the database to a particular point in time relative to a time at which the particular transaction occurred, wherein the user input selecting the particular transaction is received using the client application;
wherein the notifications include a first notification of a first transaction of the plurality of transactions, wherein the first transaction was performed in response to particular SQL code, wherein storing the information specifying the plurality of transactions includes storing information specifying that the first transaction was performed in response to particular SQL code, and wherein displaying the graphical user interface includes displaying the particular SQL code.

2. The computer-accessible storage medium of claim 1,
wherein the particular transaction is the first transaction of the plurality of transactions;
wherein the first transaction occurs after a second transaction of the plurality of transactions, wherein no other transactions of the plurality of transactions occur between the second transaction and the first transaction;
wherein said restoring the database comprises restoring the database to a point in time between a time at which the second transaction occurred and the time at which the first transaction occurred.

3. The computer-accessible storage medium of claim 1,
wherein the particular transaction is the first transaction of the plurality of transactions;
wherein the first transaction occurs before a second transaction of the plurality of transactions, wherein no other transactions of the plurality of transactions occur between the first transaction and the second transaction;
wherein said restoring the database comprises restoring the database to a point in time between the time at which the first transaction occurred and a time at which the second transaction occurred.

4. The computer-accessible storage medium of claim 1,
wherein the program instructions are executable to call an application programming interface (API) to request to begin receiving notifications of transactions that occur in the database.

5. The computer-accessible storage medium of claim 1,
wherein requesting to begin receiving notifications of transactions that occur in the database includes:
specifying one or more transaction types; and
requesting to begin receiving notifications of transactions of the one or more specified transaction types;
wherein each transaction of the plurality of transactions is a transaction of a type included in the one or more specified transaction types.

6. The computer-accessible storage medium of claim 1,
wherein requesting to begin receiving notifications of transactions that occur in the database includes:
specifying one or more objects in the database; and
requesting to begin receiving notifications of transactions that change the one or more specified objects;
wherein each transaction of the plurality of transactions is a transaction that changes one or more of the one or more specified objects.

7. The computer-accessible storage medium of claim 1,
wherein receiving the notifications of the plurality of transactions comprises receiving programmatic notifications indicating the plurality of transactions.

8. The computer-accessible storage medium of claim 1,
wherein the notifications of the plurality of transactions are received in real time as the transactions occur in the database.

9. The computer-accessible storage medium of claim 1,
wherein the program instructions are executable to call an application programming interface (API) to restore the database to the particular point in time.

10. The computer-accessible storage medium of claim 1,
wherein each notification specifies a time at which a respective transaction of the plurality of transactions occurred;
wherein storing the information specifying the plurality of transactions includes storing information indicating the time specified by each notification.

11. The computer-accessible storage medium of claim 1,
wherein the notifications include the first notification of the first transaction of the plurality of transactions, wherein the first notification specifies one or more objects changed by the first transaction;
wherein storing the information specifying the plurality of transactions includes storing information specifying the one or more objects changed by the first transaction;
wherein displaying the graphical user interface includes displaying information indicating that the first transaction changed the one or more objects.

12. The computer-accessible storage medium of claim 1,
wherein the database is a relational database.

13. A system comprising:
one or more processors; and
memory storing program instructions, wherein the program instructions are executable by the one or more processors to:
submit a request to begin receiving notifications of transactions that change data in a database, wherein the request is submitted from a client application to database management software;
in response to the request, receive notifications of a plurality of transactions that change data in the database, wherein the notifications are provided to the client application by sending a plurality of programmatic events from the database management software to the client application, wherein the plurality of transactions occur after the request is submitted, and wherein at least one of the notifications is received by the client application before all of the plurality of transactions have occurred in the database;
store information specifying the plurality of transactions, wherein the information specifying the plurality of transactions is stored by the client application in response to the notifications;
in response to user input requesting to restore the database to a previous state, retrieve the stored information using the client application and display a graphical user interface listing each individual transaction of the plurality of transactions specified by the stored information, wherein at least some of the notifications are received by the client application prior to the user input requesting to restore the database; and
in response to user input selecting a particular transaction of the plurality of transactions listed in the graphical user interface, restore the database to a particular point in time relative to a time at which the particular transaction occurred, wherein the user input selecting the particular transaction is received using the client application;
wherein the notifications include a first notification of a first transaction of the plurality of transactions, wherein the first transaction was performed in response to particular SQL code, wherein storing the information specifying the plurality of transactions includes storing information specifying that the first transaction was performed in response to particular SQL code, and wherein displaying the graphical user interface includes displaying the particular SQL code.

14. The system of claim 13,
wherein the particular transaction is the first transaction of the plurality of transactions;
wherein the first transaction occurs after a second transaction of the plurality of transactions, wherein no other transactions of the plurality of transactions occur between the second transaction and the first transaction;

wherein said restoring the database comprises restoring the database to a point in time between a time at which the second transaction occurred and the time at which the first transaction occurred.

15. The system of claim 13,
wherein the particular transaction is the first transaction of the plurality of transactions;
wherein the first transaction occurs before a second transaction of the plurality of transactions, wherein no other transactions of the plurality of transactions occur between the first transaction and the second transaction;
wherein said restoring the database comprises restoring the database to a point in time between the time at which the first transaction occurred and a time at which the second transaction occurred.

16. A method comprising:
submitting a request to begin receiving notifications of transactions that change data in a database, wherein the request is submitted from a client application to database management software;
in response to the request, receiving notifications of a plurality of transactions that change data in the database, wherein the notifications are provided to the client application by sending a plurality of programmatic events from the database management software to the client application, wherein the plurality of transactions occur after the request is submitted, and wherein at least one of the notifications is received by the client application before all of the plurality of transactions have occurred in the database;
storing information specifying the plurality of transactions, wherein the information specifying the plurality of transactions is stored by the client application in response to the notifications;
in response to user input requesting to restore the database to a previous state, retrieving the stored information and displaying a graphical user interface listing each individual transaction of the plurality of transactions specified by the stored information, wherein at least some of the notifications are received by the client application prior to the user input requesting to restore the database; and
in response to user input selecting a particular transaction of the plurality of transactions listed in the graphical user interface, restoring the database to a particular point in time relative to a time at which the particular transaction occurred;
wherein the notifications include a first notification of a first transaction of the plurality of transactions, wherein the first transaction was performed in response to particular SQL code, wherein storing the information specifying the plurality of transactions includes storing information specifying that the first transaction was performed in response to particular SQL code, and wherein displaying the graphical user interface includes displaying the particular SQL code.

17. The method of claim 16,
wherein the particular transaction is the first transaction of the plurality of transactions;
wherein the first transaction occurs after a second transaction of the plurality of transactions, wherein no other transactions of the plurality of transactions occur between the second transaction and the first transaction;
wherein said restoring the database comprises restoring the database to a point in time between a time at which the second transaction occurred and the time at which the first transaction occurred.

18. The method of claim 16,
wherein the particular transaction is the first transaction of the plurality of transactions;
wherein the first transaction occurs before a second transaction of the plurality of transactions, wherein no other transactions of the plurality of transactions occur between the first transaction and the second transaction;
wherein said restoring the database comprises restoring the database to a point in time between the time at which the first transaction occurred and a time at which the second transaction occurred.

\* \* \* \* \*